United States Patent [19]
Ishibuchi et al.

[11] Patent Number: 6,032,713
[45] Date of Patent: Mar. 7, 2000

[54] CORRUGATED BOARD MANUFACTURING SYSTEM

[75] Inventors: Hiroshi Ishibuchi; Kazukiyo Kouno; Kuniaki Wakusawa; Kouji Hattori, all of Hiroshima; Yukuharu Seki; Makoto Ando, both of Mihara, all of Japan

[73] Assignee: Mitsubishi Heavy Industries, Ltd., Tokyo, Japan

[21] Appl. No.: 08/914,146

[22] Filed: Aug. 19, 1997

[30] Foreign Application Priority Data

Aug. 23, 1996 [JP] Japan .................................. 8-222041

[51] Int. Cl.⁷ .............................. B32B 31/00; B31F 1/20; B31F 1/00
[52] U.S. Cl. .......................... 156/361; 156/462; 156/468; 156/470; 156/471; 156/205
[58] Field of Search ..................................... 156/205, 210, 156/462, 468, 470, 471, 361

[56] References Cited

U.S. PATENT DOCUMENTS

| | | |
|---|---|---|
| 3,567,553 | 3/1971 | Antwerpen . |
| 3,700,518 | 10/1972 | Ohmori . |
| 3,981,758 | 9/1976 | Thayer et al. ....................... 156/470 X |
| 4,369,905 | 1/1983 | Tokuno ..................................... 226/17 |
| 4,392,910 | 7/1983 | Tokuno et al. ........................... 156/361 |
| 4,550,377 | 10/1985 | Craemer ............................... 156/205 X |
| 4,576,663 | 3/1986 | Bory ..................................... 156/361 X |
| 4,704,171 | 11/1987 | Thompson et al. .................. 156/361 X |
| 4,737,846 | 4/1988 | Tokuno et al. ........................... 358/106 |
| 4,886,563 | 12/1989 | Bennett et al. .......................... 156/205 |
| 4,919,353 | 4/1990 | Isowa et al. ............................ 242/58.6 |
| 4,935,082 | 6/1990 | Bennett et al. .......................... 156/205 |
| 5,223,069 | 6/1993 | Tokuno et al. ....................... 156/361 X |

FOREIGN PATENT DOCUMENTS

| | | | |
|---|---|---|---|
| 11926/88 | 4/1991 | Australia ............................... | 156/462 |
| 0321247 | 6/1989 | European Pat. Off. . | |
| 1212042 | 3/1960 | France . | |
| 9215118 | 9/1992 | France . | |
| 495499 | 4/1930 | Germany . | |
| 1316257 | 12/1989 | Japan ..................................... | 156/205 |
| 9627494 | 9/1996 | Rep. of Korea . | |
| 1071132 | 6/1967 | United Kingdom . | |
| 2012670 | 8/1979 | United Kingdom . | |
| 2234367 | 1/1991 | United Kingdom ................... | 156/205 |
| 91/17881 | 11/1991 | WIPO ................................... | 156/210 |

*Primary Examiner*—Richard Crispino
*Assistant Examiner*—Sue A. Purvis
*Attorney, Agent, or Firm*—Rothwell, Figg, Ernst & Kurz, P.C.

[57] ABSTRACT

A first tension adjustor for adjusting the tension of a liner and a pitch measuring device for measuring the corrugation pitch of a first core board of a single-faced corrugated board are used. A first tension controller operates so that the tension acting on the liner is adjusted on the basis of the corrugation pitch of the first core board of the single-faced corrugated board. Further, a second tension adjustor for adjusting the tension of the single-faced corrugated board and a phase shift measuring device for measuring a phase shift between the corrugations of the first core board of the single-faced corrugated board and the corrugations of a second core board to be laminated to the first core board are used. A second tension controller operates so that the tension acting on the single-faced corrugated board is adjusted on the basis of the phase shift measured by the phase shift measuring device. According to this construction it is possible to prevent a pitch shift and a phase shift of core board corrugations and there can be obtained a corrugated board of high quality.

4 Claims, 12 Drawing Sheets

CORRUGATED BOARD MANUFACTURING SYSTEM

BACKGROUND OF THE INVENTION

The present invention relates to a manufacturing system for forming a corrugated board of plural layers by laminating a plurality of corrugated core boards between a pair of liners.

Recently, as a corrugated board improved in strength, there has been proposed a double-faced corrugated board having plural layers of core boards. More particularly, as shown in FIG. 7, a corrugated board $S_a$ is formed by laminating two corrugated core boards $C_1$ and $C_2$ equal in both pitch $P_0$ and flute tip height $H_0$ between a pair of liners upper and lower liners $L_1, L_2$.

As shown in FIG. 8, the corrugated board $S_a$ is manufactured by delivering the liner $L_1$ from roll paper 102 loaded on a mill roll stand 101, applying glue to the core board $C_2$ by means of a glue applicator roll 104 of a single facer 103, laminating the thus-glued core board to the core board $C_1$ while passing a pressure roll 105, and then passing the thus-laminated core boards through a clearance between an upper roll 106 and a lower roll 107 meshing with each other to corrugate the core boards. The corrugated core boards $C_1$ and $C_2$ are then guided along the peripheral surface of the upper roll 106 and are applied with glue at their flute tips by means of a glue applicator roll 108, thereafter join to the liner $L_1$ at the position between the upper roll 106 and a pressure roll 109, and are laminated to the liner by the application of appropriate amounts of heat and pressure to form a single-faced corrugated board $S_2$. Thereafter, though not shown, a liner is laminated to the single-faced corrugated board $S_2$ to form a double-faced corrugated board.

The corrugated board $S_a$ is thus formed by laminating two core boards $C_1$ and $C_2$ between a pair of upper and lower liners $L_1, L_2$ and is therefore improved in strength as compared with a corrugated board formed by laminating one core board between two liners. However, since both core boards $C_1$ and $C_2$ are equal in pitch $P_0$ and flute tip height $H_0$, the strength of the corrugated board $S_a$ may be insufficient in a certain use. In view of this point, as a corrugated board further improved in strength, there has been proposed a double-faced corrugated board having plural layers of core boards different in flute tip height. As shown in FIG. 9, the said corrugated board, indicated at $S_b$, is formed by laminating two corrugated core boards $C_1$ and $C_2$ between a pair of upper and lower liners $L_1, L_2$, the core boards $C_1$ and $C_2$ being equal in pitch $P_0$ but having different flute tip heights $H_1$ and $H_2$.

The corrugated board $S_b$ is manufactured in such a manner as shown in FIG. 10. That is, the liner $L_1$ is delivered from roll paper 202 loaded on a mill roll stand 201, while the core board $C_1$ is passed through a clearance between an upper roll 204 and a pressure roll 205 meshing with each other in a first single facer 203, whereby the core board $C_1$ is formed into a corrugated shape of low flute tips. The corrugated core board $C_1$ is then guided along the peripheral surface of the upper roll 204 and is applied with glue at its flute tips by means of a glue applicator roll 206. The thus-glued, corrugated core board $C_1$ then joins to the liner $L_1$ at the position between the upper roll 204 and a pressure roll 207, and both are laminated together by the application of appropriate amounts of heat and pressure to form a single-faced corrugated board $S_1$. The single-faced corrugated board $S_1$ is then fed to a single facer 208, while the core board $C_2$ is passed through a clearance between an upper roll 209 and a lower roll 210 meshing with each other and is thereby formed into a corrugated shape of high flute tips.

While guided along the peripheral surface of the upper roll 209, the corrugated core board $C_2$ is applied with glue at its flute tips by means of a glue applicator roll 211, then joins to the single-faced corrugated board $S_1$ at the position between the upper roll 209 and a pressure roll 212 and is laminated to the core board $C_1$ by the application of appropriate amounts of heat and pressure to form a single-faced corrugated board $S_2$. Though not shown, a double-faced corrugated board is fabricated by laminating a liner to the single-faced corrugated board $S_2$.

In the conventional system for manufacturing the corrugated board $S_b$, the corrugated core board $C_1$ is laminated in the first single facer 203 to the liner $L_1$ which is traveling while maintaining a predetermined tension after delivery from the roll paper 202. However, after the single-faced corrugated board $S_1$ has passed the first single facer 203, its tension drops or vanishes. Consequently, there arises the problem that when the core board $C_2$ is laminated to the core board $C_1$ of the single-faced corrugated board $S_1$ in the second single facer 208, it is impossible to laminate both core boards properly because their corrugations are displaced from each other.

More particularly, in the single facer 203, as shown in FIG. 11, the corrugated core board $C_1$ is laminated to the liner $L_1$ while the liner is maintained at a predetermined tension, so the pitch of the core board $C_1$ is $P_a$ and there are three flute tips for each predetermined length $M_1$. On the other hand, after passing the first single facer 203, the tension of the single-faced corrugated board $S_1$ drops or vanishes, so that the pitch $P_b$ of the core board $C_1$ becomes smaller and there are four flute tips at the predetermined length $M_1$ (three flute tips at a predetermined length $M_2$). See FIG. 12. In the second single facer 208, therefore, it is difficult to laminate the core boards $C_1$ and $C_2$ of different flute tip pitches P, and thus it is impossible to form a proper single-faced corrugated board $S_2$. As noted previously, if the core boards $C_1$ and $C_2$ are different in the flute tip pitch P from each other in the second single facer 208, there will occur a phase shift. In more particular terms, as shown in FIG. 13, if the flute tip pitch $P_2$ of the core board $C_2$ becomes larger than the flute tip pitch $P_1$ of the core board $C_1$, there occurs a phase shift of $+\delta$ and the corrugations of the core boards $C_1$ and $C_2$ are displaced from each other. Further, as shown in FIG. 14, if the flute tip pitch $P_2$ of the core board $C_2$ is smaller than the flute tip pitch $P_1$ of the core board $C_1$, there occurs a phase shift of $-\delta$ and the corrugations of the core boards $C_1$ and $C_2$ are displaced from each other. Thus, once there occurs a displacement in corrugation between the core boards $C_1$ and $C_2$ in the second single facer 208, it becomes difficult to laminate both core boards properly, thus resulting in that not only the primary function of the double-faced corrugated board having plural layers of core boards for attaining both buffering effect and enhancement of strength can no longer be exhibited but also the double-faced corrugated board becomes no longer useful as product.

SUMMARY OF THE INVENTION

The present invention solves the above-mentioned problems and it is an object of the invention to provide a manufacturing system capable of preventing pitch shift and phase shift of corrugations and affording a corrugated board of high quality.

In order to achieve the above-mentioned object, in the first aspect of the present invention there is provided a corrugated board manufacturing system including a first single facer for laminating a first core board formed in a predetermined corrugated shape to a liner and a second single facer for laminating a second core board formed in a predetermined corrugated shape to the first core board of a single-faced corrugated board formed by the first single facer in such a manner that the corrugations of the second core board match the corrugations of the first core board, the corrugated board manufacturing system further including:

a tension adjustor for adjusting the tension of the single-faced corrugated board formed by the first single facer;

a phase shift measurer for measuring a phase shift between the corrugations of the first core board of the single-faced corrugated board formed by the first single facer and the corrugations of the second core board; and a tension controller which makes control so that the tension acting on the single-faced corrugated board is adjusted by the tension adjustor on the basis of the phase shift measured by the phase shift measurer.

Thus, in the first single facer the first core board formed in a predetermined corrugated shape is laminated to a liner, then in the second single facer the second core board formed in a predetermined corrugated shape is laminated to the first core board of the single-faced corrugated board of a single layer formed by the first single facer in such a manner that the corrugations of the second core board match the corrugations of the first core board, whereby there is formed a single-faced corrugated board having plural layers. During this operation, the phase shift measurer measures a phase shift between the corrugations of the first core board and the corrugations of the second core board laminated to the first core board. Once this phase shift is measured, the tension controller operates so that the tension of the single-faced corrugated board having a single layer is adjusted by the tension adjustor. In the second single facer, therefore, there is no fear of phase shift between the corrugations of the first and second core boards, and both are laminated together accurately.

In the second aspect of the present invention there is provided, in combination with the system in the first aspect, a corrugated board manufacturing system wherein the tension adjustor adjusts the tension by exerting a resisting force which resists the traveling direction on the surface of the single-faced corrugated board being conveyed.

Thus, when there is measured a pitch shift in the corrugations of the first core board of the single-faced corrugated board, or when a phase shift is measured between the corrugations of the first and second core boards, the tension adjustor can easily adjust the tension by exerting a resisting force which resists the traveling direction on the surface of the single-faced corrugated board.

In the third aspect of the present invention there is provided, in combination with the system in the first aspect, a corrugated board manufacturing system wherein the tension controller operates so that the tension acting on the single-faced corrugated board is adjusted by the tension adjustor on the basis of both the result of measurement provided from the phase shift measurer and the amount of tension to be changed which is calculated from a data base on paper physical properties of the liner.

Thus, when there is measured a phase shift between the corrugations of the first and second core boards, the tension controller controls the tension acting on the single-faced corrugated board on the basis of both the result of measurement provided from the phase shift measurer and the amount of tension to be changed which is calculated from a data base on paper physical properties of the liner. In this way the phase shift between the first and second core boards can be adjusted accurately according to the kind of paper.

In the fourth aspect of the present invention there is provided a corrugated board manufacturing system including a first single facer for laminating a first core board formed in a predetermined corrugated shape to a liner and a second single facer for laminating a second core board formed in a predetermined corrugated shape to the first core board of the single-faced corrugated board formed by the first single facer in such a manner that the corrugations of the second core board match the corrugations of the first core board, the corrugated board manufacturing system further including:

a first tension adjustor for adjusting the tension of the liner conveyed to the first single facer;

a pitch measurer for measuring the pitch of corrugations of the first core board of the single-faced corrugated board formed by the first single facer;

a second tension adjustor for adjusting the tension of the single-faced corrugated board formed by the first single facer;

a phase shift measurer for measuring a phase shift between the corrugations of the first core board of the single-faced corrugated board formed by the first single facer and the corrugations of the second core board;

a first tension controller which operates so that the tension acting on the liner is adjusted by the first tension adjustor on the basis of the corrugation pitch of the first core board of the single-faced corrugated board measured by the pitch measurer; and a second tension controller which operates so that the tension acting on the single-faced corrugated board is adjusted by the second tension adjustor on the basis of the phase shift measured by the phase shift measurer.

Thus, in the first single facer the first core board formed in a predetermined corrugated shape is laminated to a liner, then in the second single facer the second core board formed in a predetermined corrugated shape is laminated to the first core board of the single-faced corrugated board of a single layer formed by the first single facer in such a manner that the corrugations of the second core board match the corrugations of the first core board, whereby there is formed a single-faced corrugated board having plural layers. During this operation, the pitch measurer measures the corrugation pitch of the first core board, and when a shift is measured in the corrugation pitch of the first core board by the pitch measurer, the first tension controller operates so that the tension acting on the liner is adjusted by the first tension adjustor. Consequently, in the second single facer there occurs no pitch shift in the corrugations of the first and second core boards of the single-faced corrugated board. Further, the phase shift measurer measures a phase shift between the corrugations of the first core board of the single-faced corrugated board having a single layer and formed by the first single facer and the corrugations of the second core board to be laminated to the first core board. When the phase shift is measured by the phase shift measurer, the second tension controller operates so that the tension of the single-faced corrugated board of a single layer is adjusted by the second tension adjustor. In the second single facer, therefore, there is no fear of phase shift between the corrugations of the first core board of the single-faced corrugated board having a single layer and the corrugations of the second core board. Consequently, both are laminated together accurately.

In the fifth aspect of the present invention there is provided, in combination with the system in the fourth aspect, a corrugated board manufacturing system wherein the first and second tension adjustors adjust the tension by exerting a resisting force which resists the traveling direction on the surface of the single-faced corrugated board or the liner being conveyed.

Thus, when there is measured a shift in the corrugation pitch of the first core board of the single-faced corrugated board, or when a phase shift between the corrugations of the first core board and the corrugations of the second core board is measured, the tension adjustor can adjust the tension easily by exerting a resisting force which resists the traveling direction on the surface of the single-faced corrugated board or on the liner surface.

In the sixth aspect of the present invention there is provided, in combination with the system in the fourth aspect, a corrugated board manufacturing system wherein the first tension controller operates so that the tension acting on the liner is adjusted by the first tension adjustor on the basis of both the result of measurement provided from the pitch measurer and the amount of tension to be changed which is calculated from a data base on paper physical properties of the liner.

Thus, when there is measured a shift in the corrugation pitch of the first core board of the single-faced corrugated board, the first tension adjustor adjusts the tension acting on the liner on the basis of both the results of the measurement conducted by the pitch measurer and the amount of tension to be changed which has been calculated from a data base on paper physical properties of the liner. In this way the corrugation pitch of the first core board can be adjusted accurately according to the kind of paper.

Further, in the seventh aspect of the present invention there is provided, in combination with the system in the fourth aspect, a corrugated board manufacturing system wherein the second tension controller operates so that the tension acting on the single-faced corrugated board is adjusted by the second tension adjustor on the basis of both the result of measurement provided from the phase shift measurer and the amount of tension to be changed which is calculated from a data base on paper physical properties of the liner.

Thus, when a phase shift is measured between the corrugations of the first core board and the corrugations of the second core board, the second tension controller operates so that the tension acting on the single-faced corrugated board is adjusted on the basis of both the result of measurement provided from the phase shift measurer and the amount of tension to be changed which is calculated from a data base on paper physical properties of the liner. In this way the phase shift between the corrugations of the first and second core boards can be coped with appropriately according to the kind of paper.

DETAILED DESCRIPTION OF THE PREFERRED EMBODIMENTS

Embodiments of the present invention will be described in detail hereinunder with reference to the accompanying drawings.

<First Embodiment>

Figure 1:
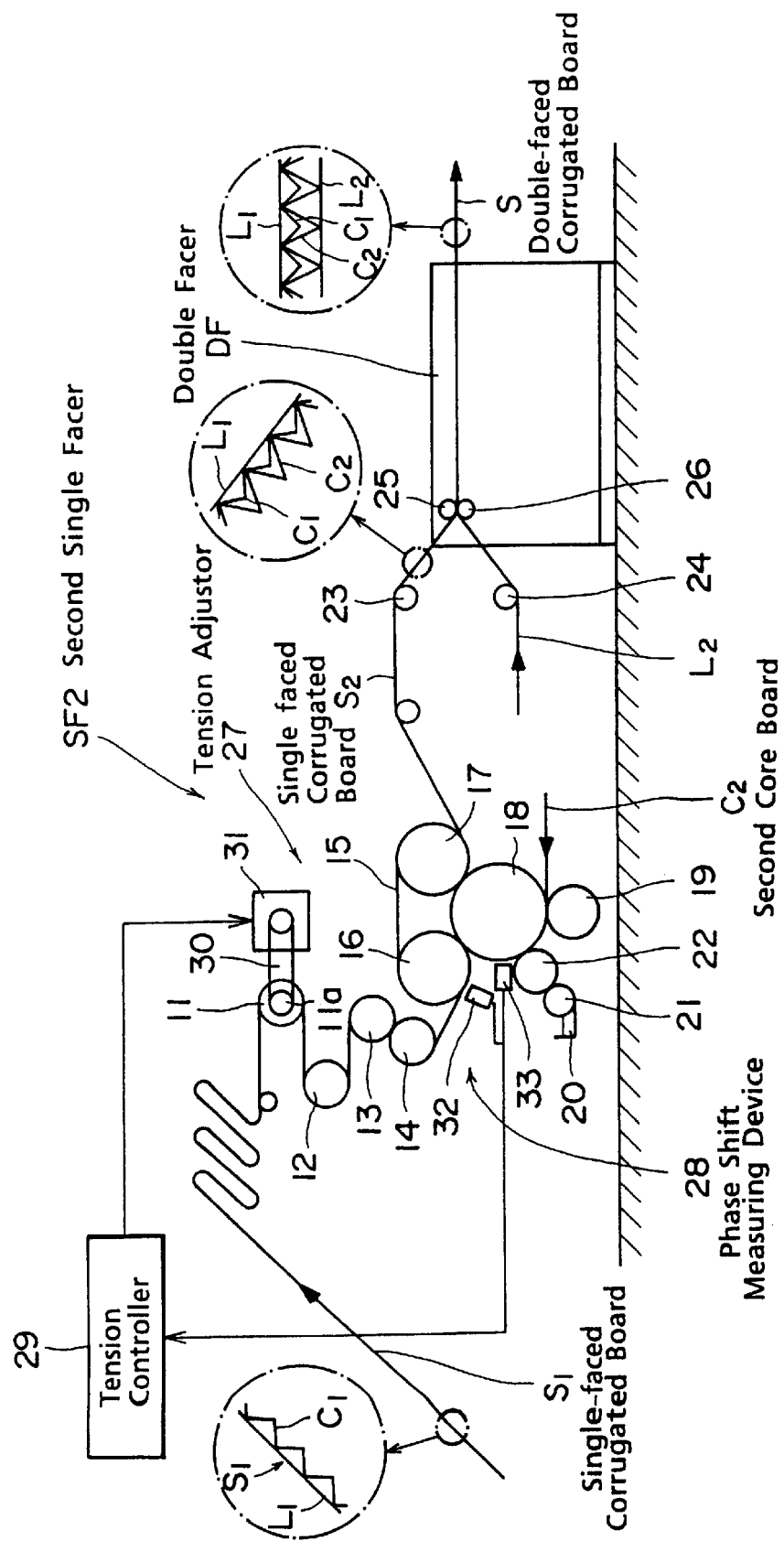
FIG. 1 is a schematic construction diagram showing a second single facer in a corrugated board manufacturing system according to a first embodiment of the present invention.

In this embodiment, as shown in FIG. 1, a corrugated board manufacturing system according to the present invention is applied to a second single facer which is for laminating a second core board formed in a predetermined shape to a first core board of a single-faced corrugated board formed by a first single facer in such a manner that the corrugations of the second core board match the corrugations of the first core board.

First, a description will be given of the second single facer. As shown in FIG. 1, in the upper portion of the second single facer indicated at SF2 there are disposed guide rolls 11 and 12 for conveying a single-faced corrugated board $S_1$ which comprises a liner $L_1$ and a first core board $C_1$, as well as preheat rolls 13 and 14 for heating the single-faced corrugated board $S_1$. Further, driving rolls 16 and 17 for driving an endless pressure belt 15 are disposed in an adjacent relation to the preheat rolls 13 and 14. On the other hand, in the lower portion of the second single facer SF2 are disposed an upper roll 18 and a lower roll 19 both having corrugations on their peripheral surfaces for corrugating a second core board $C_2$, the upper roll 18 being in contact with the pressure belt 15. Further, glue applicator rolls 21 and 22 for applying glue present in a glue reservoir 20 to flute tips of the second core board $C_2$ are disposed for the upper roll 18.

A double facer DF is disposed downstream of the second single facer SF2 in the conveyance direction. On the upstream side of the double facer DF are disposed a guide roller 23 for guiding a single-faced corrugated board $S_2$ formed by the second single facer SF2 and a guide roller 24 for guiding a liner $L_2$, as well as a pair of pressure rollers 25 and 26 for holding the single-faced corrugated board $S_2$ and the liner $L_2$ there between and laminating the two to each other.

According to this embodiment, in the second single facer SF2 there are provided a tension adjustor 27 for adjusting the tension of the single-faced corrugated board $S_1$ formed by a first single facer SF1, a phase shift measuring device 28 for measuring a phase shift between the corrugations of the first core board $C_1$ of the single-faced corrugated board $S_1$ formed by the first single facer SF1 and the corrugations of the second core board $C_2$ to be laminated to the first core board $C_1$, and a tension controller 29 which operates so that the tension acting on the single-faced corrugated board $S_1$ is adjusted by the tension adjustor 27 on the basis of the phase shift between the corrugations of the first and second core boards $C_1, C_2$ measured by the phase shift measuring device 28.

Figure 2:
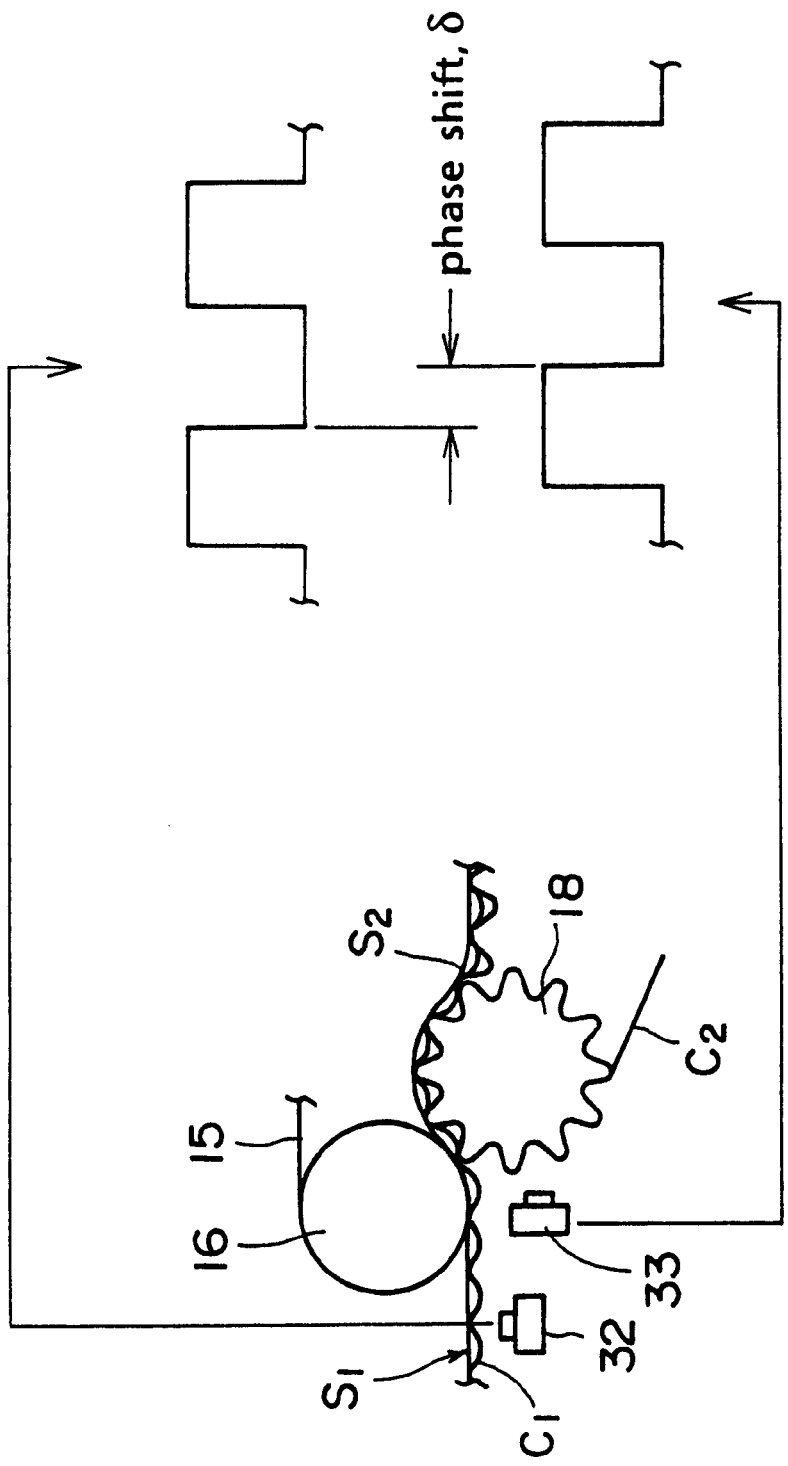
FIG. 2 is a schematic diagram explaining the principle of a phase shift measuring device.

The tension adjustor 27 operates by connecting a brake unit 31 to a rotating shaft 11a of a guide roll 11 through a transmission belt 30. The phase shift measuring device 28 comprises a pulse sensor 32 for detecting a flute tip of corrugation of the first core board $C_1$ (single-faced corrugated board $S_1$) and a pulse sensor 33 for detecting a flute tip of corrugation of the second core board $C_2$. More specifically, as shown in FIG. 2, the pulse sensor 32 outputs the corrugation of the first core board $C_1$ as a pulse signal, while the pulse sensor 33 outputs the corrugation of the second core board $C_2$ as a pulse signal, and a flute tip phase shift $\delta$ is measured from both pulse signals.

The operation of the corrugated board manufacturing system according to this embodiment will be described below.

As shown in FIG. 1, in the first single facer (not shown), the first coreboard $C_1$ which has been corrugated small is laminated to a liner $L_1$ to fabricate a single-faced corrugated board $S_1$. The single-faced corrugated board $S_1$ thus fabricated is conveyed to the second single facer SF2 through a conveyance path (not shown) and is fed between the pressure belt 15 and the upper roll 18 while being guided by the guide rolls 11, 12 and the preheat rolls 13, 14. On the other hand, the second core board $C_2$ is corrugated while passing between the upper roll 18 and the lower roll 19, then is applied with glue at its corrugation flute tips by the flue applicator rolls 21 and 22, and is thereafter fed between the pressure belt 15 and the upper roll 18 together with the single-faced corrugated board $S_1$. In a laminated state of the single-faced corrugated board and the second core board $C_2$, predetermined amounts of heat and pressure are applied to the two, whereby a single-faced corrugated board $S_2$ is fabricated.

Figure 3:
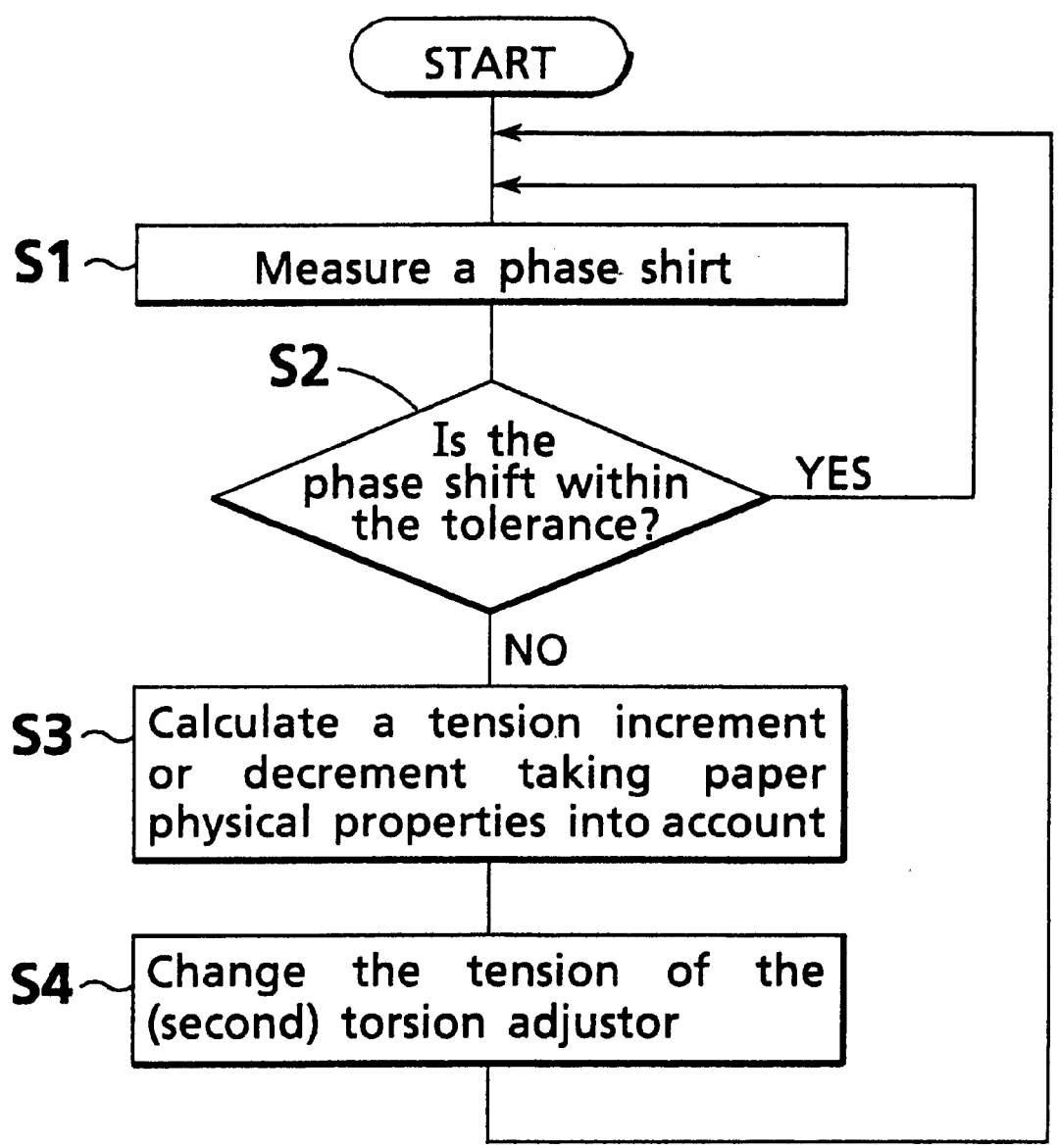
FIG. 3 is a flowchart which represents a tension adjusting method against a phase shift.

During the above operation, the phase shift measuring device 28 measures a phase shift between the corrugations of the first core board $C_1$ of the single-faced corrugated board $S_1$ and the corrugations of the second core board $C_2$ to be laminated to the first core board, and feeds back the phase shift $\delta$ as the result of detection made by the pulse sensors 32 and 33 to the tension controller 29, which in turn operates so that the tension of the single-faced corrugated board $S_1$ is adjusted by the tension adjustor 27. To be more specific, as shown in the flowchart of FIG. 3, the phase shift $\delta$ between the corrugations of the first and second core boards $C_1, C_2$ is measured in step S1, then in step S2 it is determined if the phase shift $\delta$ is within the tolerance or not. If the answer is affirmative in step S2, the flow returns to step S1 to continue measurement of the phase shift $\delta$. On the other hand, if the answer is negative in step S2, the flow advances to step S3 to calculate a tension increment or decrement taking paper physical properties into account. Then, in step S4, the tension adjustor 27 adjusts the tension of the single-faced corrugated board $S_1$.

Figure 13:
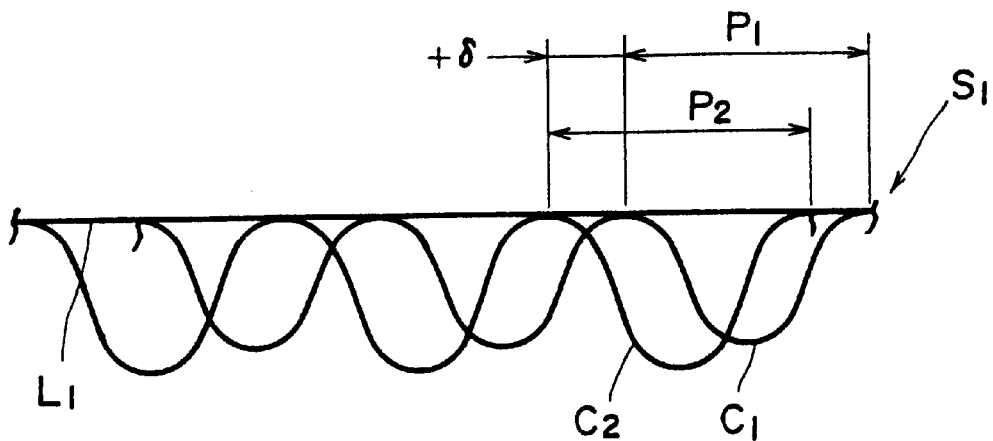
FIG. 13 is an explanatory diagram of related art showing the occurrence of a phase shift +δ due to a smaller flute tip pitch of a first core board than the flute tip pitch of a second core board in a single-faced corrugated board.
Figure 14:
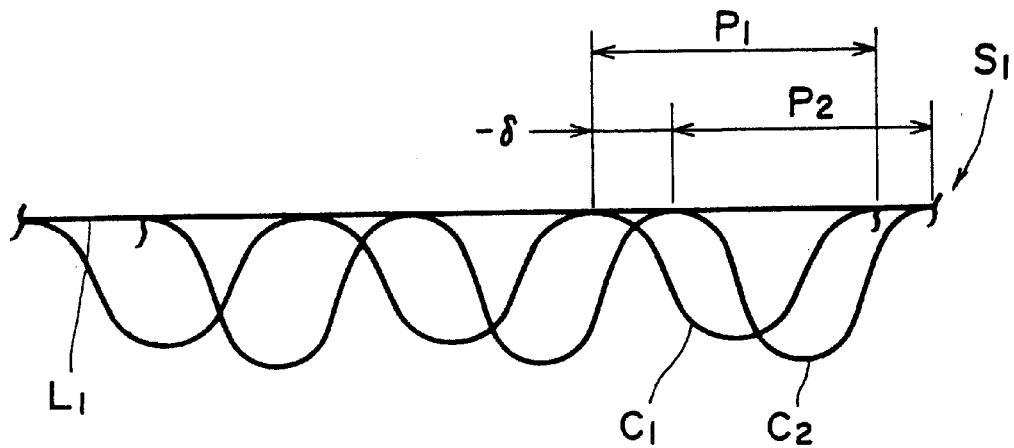
FIG. 14 is an explanatory diagram of related art showing the occurrence of a phase shift −δ due to a larger flute tip pitch of a first core board than the flute tip pitch of a second core board in a single-faced corrugated board.

The tension of the single-faced corrugated board $S_1$ is adjusted in the following manner. For example, as shown in FIG. 13, if a flute tip pitch $P_1$ of the first core board $C_1$ is smaller than a flute tip pitch $P_2$ of the second core board $C_2$ and a phase shift of $+\delta$ is measured, the tension acting on the single-faced corrugated board $S_1$ is increased. As shown in FIG. 14, if the flute tip pitch $P_1$ of the first core board $C_1$ is larger than the flute tip pitch $P_2$ of the second core board $C_2$ and a phase shift of $-\delta$ is measured, the tension acting on the single-faced corrugated board $S_1$ is decreased. Thus, upon occurrence of a phase shift $\delta$ between the corrugations of the first and second core boards $C_1, C_2$, the tension adjustor 27 adjusts the tension of the single-faced corrugated board $S_1$, so that both core boards become coincident in phase with each other and hence are laminated together accurately.

Thereafter, as shown in FIG. 1, the single-faced corrugated board $S_2$ fabricated by lamination of the second core $C_2$ to the single-faced corrugated board $S_1$ is fed to the double facer DF, in which glue is applied to the corrugation flute tips of the second core board $C_2$ of the single-faced corrugated board $S_2$. The board $S_2$, with liner $L_2$ laminated thereto, is fed between the paired pressure rollers 25 and 26. Then, predetermined amounts of heat and pressure are applied to the single-faced corrugated board $S_2$ and the liner $L_2$ both in a laminated state to fabricate a double-faced corrugated board S having a two-layer core board structure.

<Second Embodiment>

Figure 4:
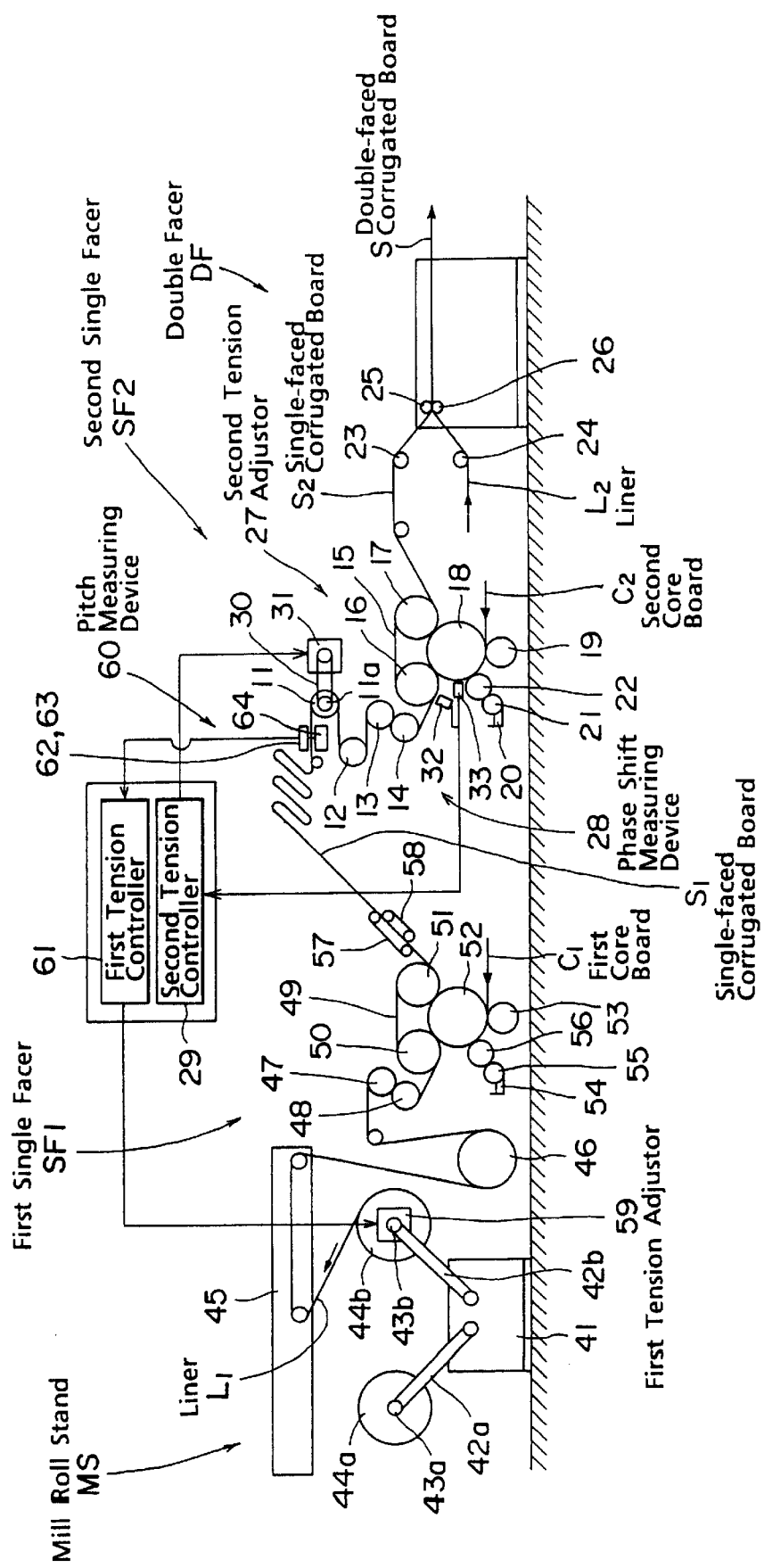
FIG. 4 is a schematic construction diagram of a corrugated board manufacturing system according to a second embodiment of the present invention.

A corrugated board manufacturing system according to a second embodiment of the present invention is described as follows. As shown in FIG. 4, the system of this embodiment comprises a mill roll stand MS, a first single facer SF1, a second single facer SF2, and a double facer DF.

In the mill roll stand MS, support shafts 43a and 43b are connected to a support base 41 through a pair of support arms 42a and 42b, respectively, with paper rolls 44a and 44b being loaded on the support shafts 43a and 43b, respectively. A paper slicer 45 is disposed above the paper rolls 44a and 44b.

In the first single facer SF1, which is adjacent to the mill roll stand MS, a preheat roll 46 for heating a liner $L_1$ and guide rolls 47 and 48 for conveying the liner $L_1$ are disposed in an inlet portion. Further, driving rolls 50 and 51 for driving an endless belt 49 circulatively are disposed at positions adjacent to the guide rolls 47 and 48. In the lower portion of the first single facer SF1 are disposed an upper roll 52 and a lower roll 53 both having corrugations on their peripheral surfaces for corrugating a first core board $C_1$. The upper roll 52 is in pressure contact with a pressure belt 49. Further, glue applicator rollers 55 and 56 for applying glue present in a glue reservoir 54 to corrugation flute tips of the first core board $C_1$ are disposed for the upper roll 25. On an outlet side of the pressure belt 49 are disposed a pair of upper and lower lift conveyors 57, 58.

In the upper portion of the second single facer SF2 are disposed guide rolls 11 and 12 for conveying a single-faced corrugated board $S_1$ which comprises the liner $L_1$ and the first core board $C_1$, as well as preheat rolls 13 and 14 for heating the single-faced corrugated board $S_1$. Adjacent the preheat rolls 13 and 14 are driving rolls 16 and 17 for driving an endless pressure belt 15. On the other hand, in the lower portion of the second single facer SF2 are disposed an upper roll 18 and a lower roll 19 both having corrugations on their peripheral surfaces for corrugating a second core board $C_2$. The upper roll 18 is in pressure contact with the pressure belt 15. Further, glue applicator rolls 21 and 22 for applying glue present in a glue reservoir 20 to corrugation flute tips of the second core board $C_2$ are disposed for the upper roll 18.

The double facer DF is disposed downstream of the second single facer SF2 in the conveyance direction. On the upstream side of the double facer DF are disposed a guide roller 23 for guiding a single-faced corrugated board $S_2$ formed by the second single facer SF2 and a guide roller 24 for guiding a liner $L_2$, as well as a pair of pressure rollers 25 and 26 for holding the board $S_2$ and the liner $L_2$ there between and laminating the two to each other.

According to this embodiment, in the first single facer SF1 are disposed a first tension adjustor 59 for adjusting the tension of the liner $L_1$ being conveyed from the mill stand MS to the first single facer SF1, a pitch measuring device 60 for measuring the corrugation pitch of the first core board $C_1$ of the single-faced corrugated board $S_1$ formed by the first single facer SF1, and a first tension controller 61 which operates so that the tension acting on the liner $L_1$ is adjusted by the first tension adjustor 59 on the basis of the corrugation pitch of the first core board $C_1$ measured by the pitch measuring device 60.

Figure 5:
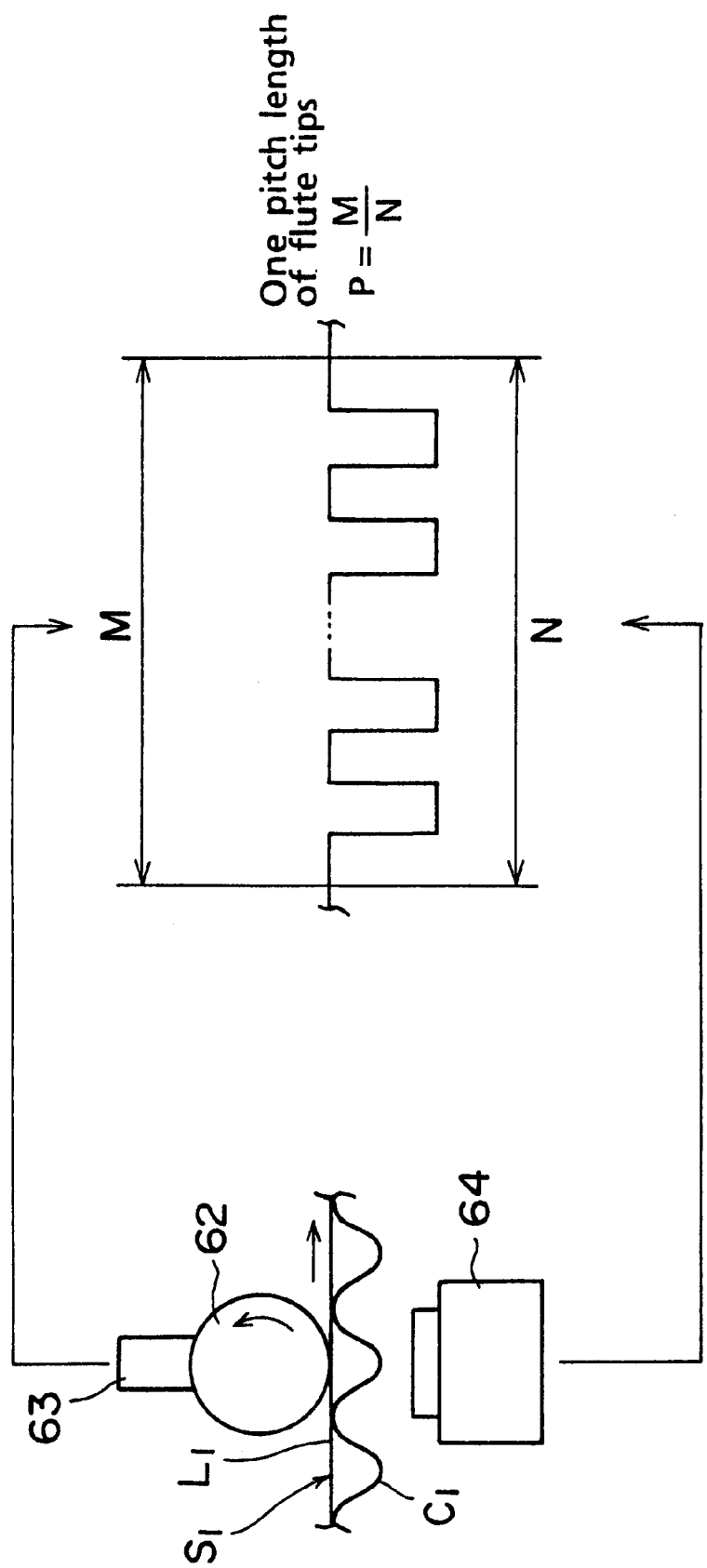
FIG. 5 is a schematic diagram explaining the principle of a pitch measuring device.

The first tension adjustor 59 is a brake unit mounted on the support shaft 43b (43a) for the paper roll 44b (44a). The pitch measuring device 60 comprises a detection roll 62 adapted to rotate synchronously in contact with the single-faced corrugated board $S_1$, a distance sensor 63 which detects the traveling distance of the single-faced corrugated board $S_1$ from the detection roll 62, and a pulse count sensor 64 for detecting the number of corrugation flute tips of the first core board $C_1$. More specifically, as shown in FIG. 5, the detection roll 62 contacts the single-faced corrugated board $S_1$ and rotates synchronously, the distance sensor 63 detects the traveling distance of the board $S_1$ from the detection roll 62 and outputs the result of the detection as a signal, and the pulse count sensor 64 outputs the number of corrugations of the first core sensor $C_1$ as a signal. Then, one pitch length P (P=M/N) of the first core board $C_1$ is calculated from the traveling distance M of the single-faced corrugated board $S_1$ and the number N of corrugations of the first core board $C_1$.

According to this embodiment, in the second single facer SF2 are disposed a second tension adjustor 27 for adjusting the tension of the single-faced corrugated board $S_1$ formed by the first single facer SF1, a phase shift measuring device 28 for measuring a phase shift between the corrugations of the first core board $C_1$ of the single-faced corrugated board $S_1$ formed by the first single facer SF1 and the corrugations of the second core board $C_2$ to be laminated to the first core board $C_1$, and a second tension controller 29 which makes control so that the tension acting on the single-faced corrugated board $S_1$ is adjusted by the second tension adjustor 27 on the basis of the corrugation phase shift of the first and second core boards $C_1,C_2$ measured by the phase shift measuring device 28.

The second tension adjustor 27 is constituted by connecting a brake unit 31 to a rotating shaft 11a of the guide roll 11 through a transmission belt 30. The phase shift measuring device 28 comprises a pulse sensor 32 for detecting a flute tip of corrugation of the first core board $C_1$ (single-faced corrugated board $S_1$) and a pulse sensor 33 for detecting a flute tip of corrugation of the second core board $C_2$. In the phase shift measuring device 28, as described in the previous first embodiment with reference to FIG. 2, the pulse sensor 32 outputs the corrugations of the first core board $C_1$ as pulse signals, while the pulse sensor 33 outputs the corrugations of the second core board $C_2$ as pulse signals, and a flute tip phase shift δ is measured from both pulse signals.

The operation of the corrugated board manufacturing system according to this second embodiment will be described below.

As shown in FIG. 4, the liner $L_1$ delivered from the paper roll 44b in the mill roll stand MS is fed to the first single facer SF1 through the paper splicer 45. In the first single facer SF1, the liner $L_1$ is heated by the preheat roll 46 and is then fed between the pressure belt 49 and the upper roll 52 while being guided by the guide rolls 47 and 48. On the other hand, the first core board $C_1$ passes between the upper roll 52 and the lower roll 53 and is corrugated thereby, then is applied with glue at its corrugation flute tips by the glue applicator rolls 55 and 56, and is then fed between the pressure belt 49 and the upper roll 52 together with the liner $L_1$. Then, predetermined amounts of heat and pressure are applied to the liner $L_1$ and the first core board $C_1$ which are in a laminated state, to fabricate a single-faced corrugated board $S_1$. The board $S_1$ thus fabricated is then fed to the second single facer SF2 by means of the lift conveyors 57 and 58.

In the second single facer SF2, the single-faced corrugated board $S_1$ is fed between the pressure belt 15 and the upper roll 18 while being guided by the guide rolls 11, 12 and the preheat rolls 13, 14. On the other hand, the second core board $C_2$ passes between the upper roll 18 and the lower roll 19 and is corrugated thereby, then is applied with glue at it corrugation flute tips by means of the glue applicator rolls 21 and 22 and is thereafter fed between the pressure roll 15 and the upper roll 18 together with the single-faced corrugated board $S_1$. Now, predetermined amounts of heat and pressure are applied to the board $S_1$ and the second core board $C_2$ which are in a laminated state, whereby a single-faced corrugated board $S_2$ is fabricated.

A change in tension of the liner $L_1$ during fabrication of the single-faced corrugated boards $S_1$ and $S_2$ may cause a shift in the flute tip pitch between the corrugations of the first and second core boards $C_1,C_2$ or may cause a phase shift. Thus, it is necessary to correct such shift continually.

Figure 6:
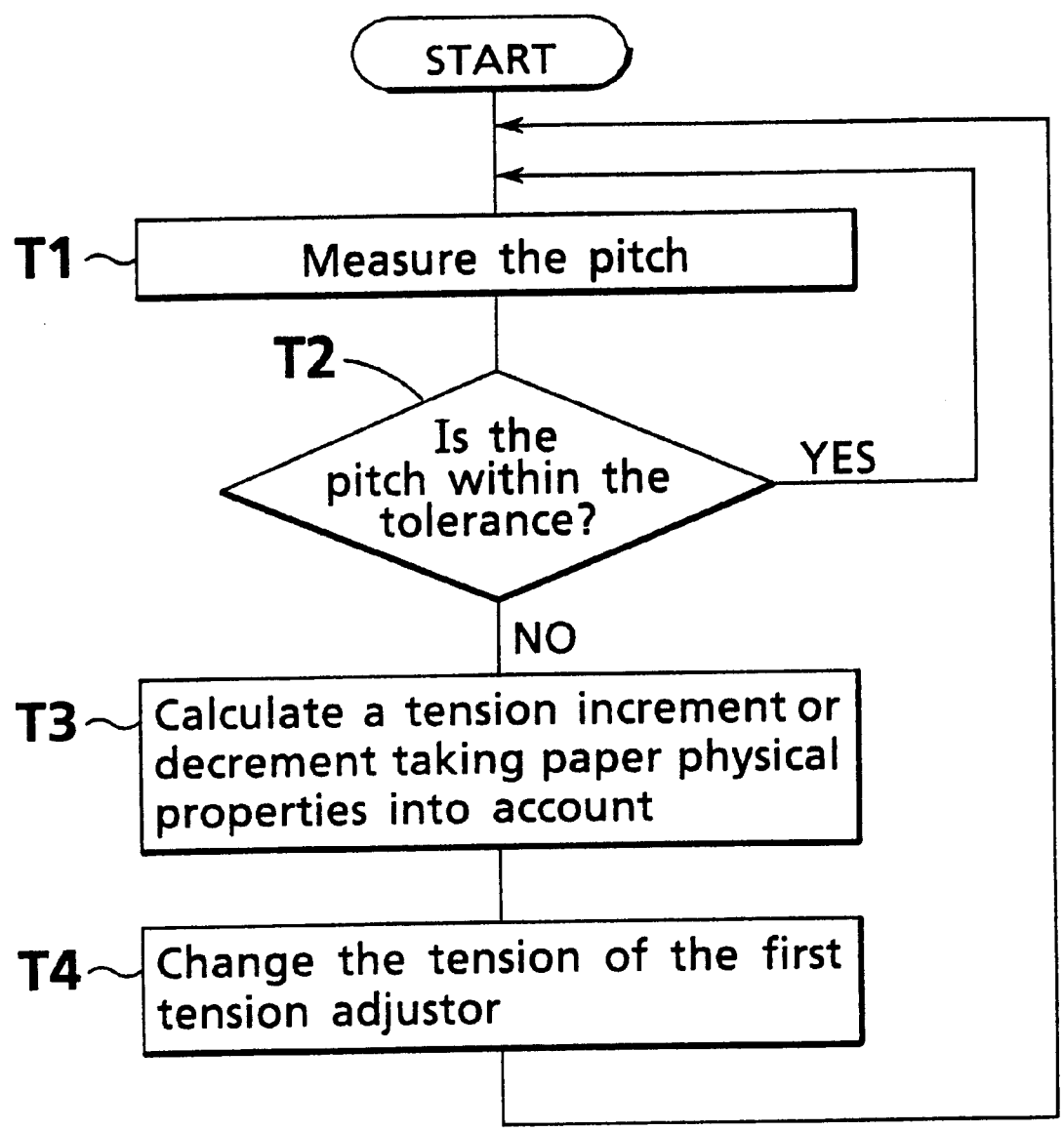
FIG. 6 is a flowchart which represents a tension adjusting method against a pitch shift.
Figure 7:
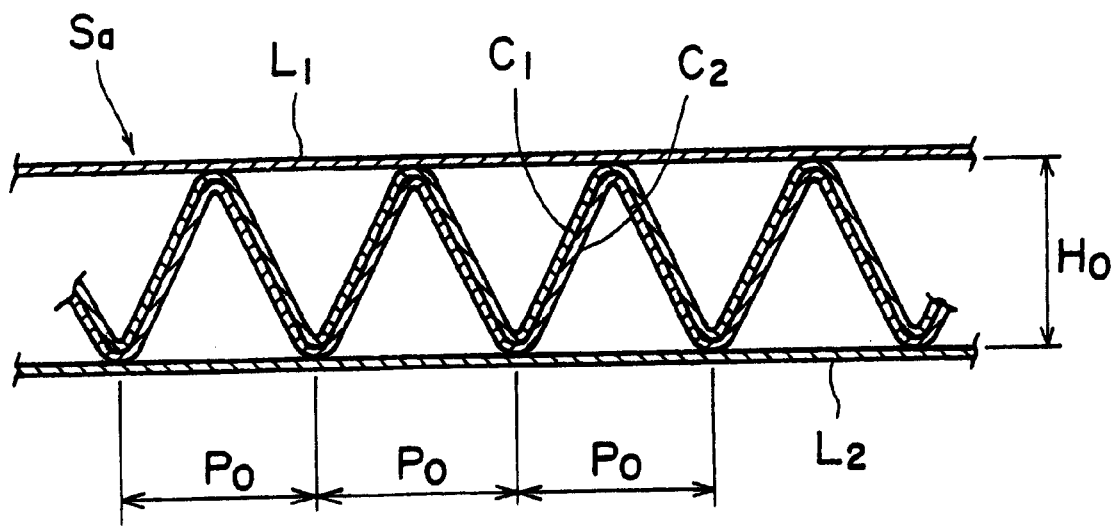
FIG. 7 is a schematic diagram of a double-faced corrugated board having plural layers of core boards.
Figure 8:
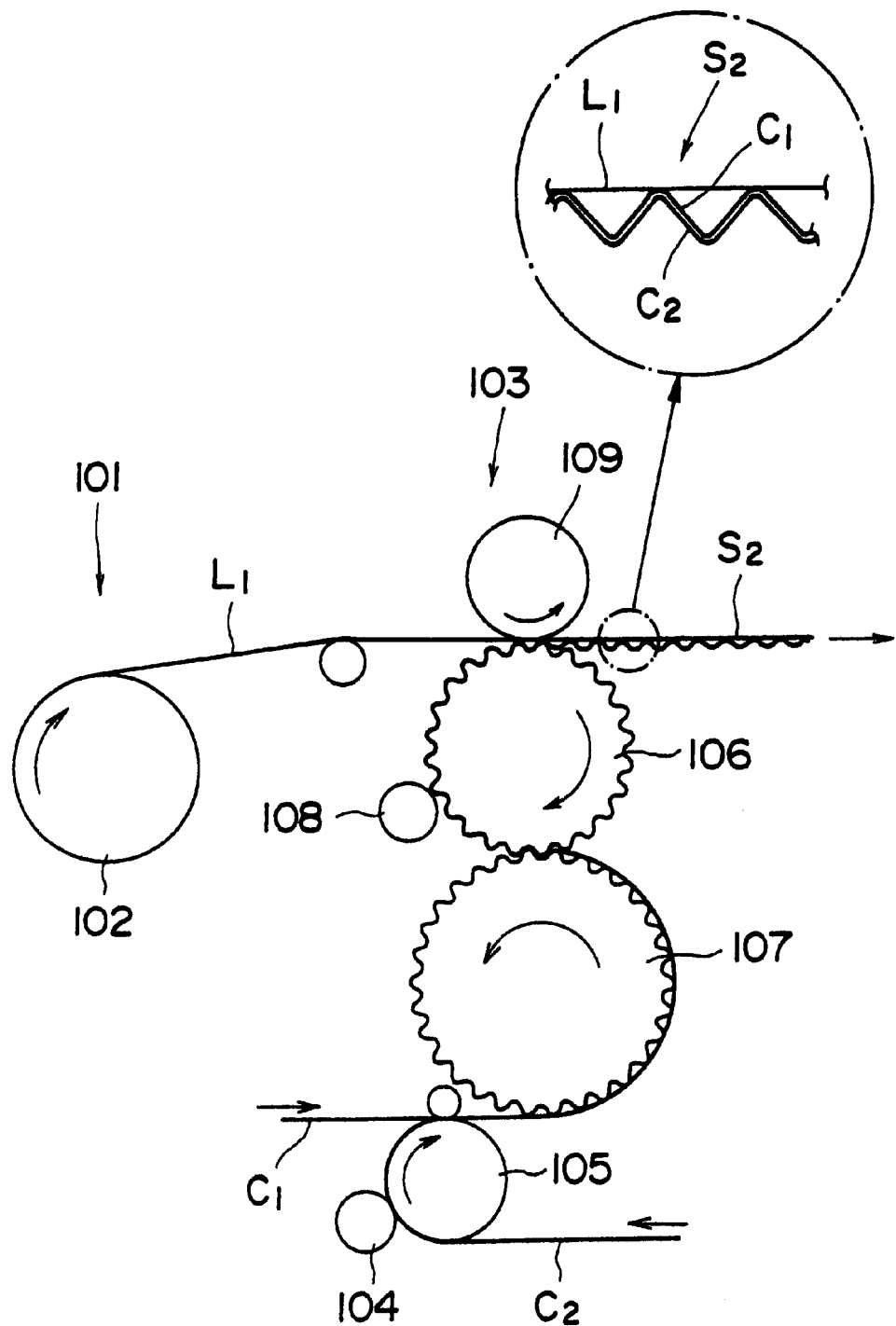
FIG. 8 is a schematic construction diagram of a double-faced corrugated board manufacturing system.
Figure 9:
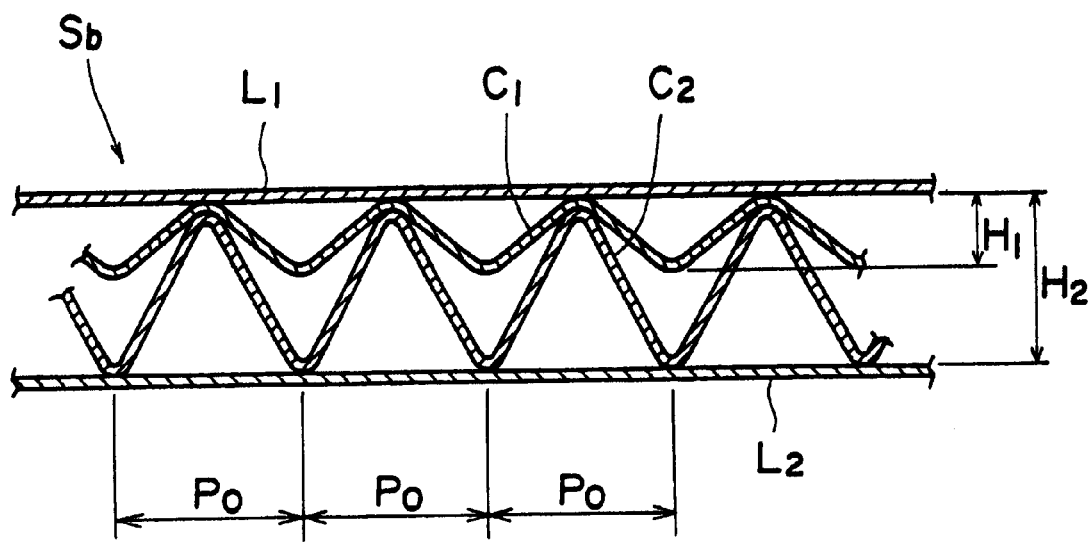
FIG. 9 is a schematic diagram of a double-faced corrugated board having plural layers of core boards.
Figure 10:
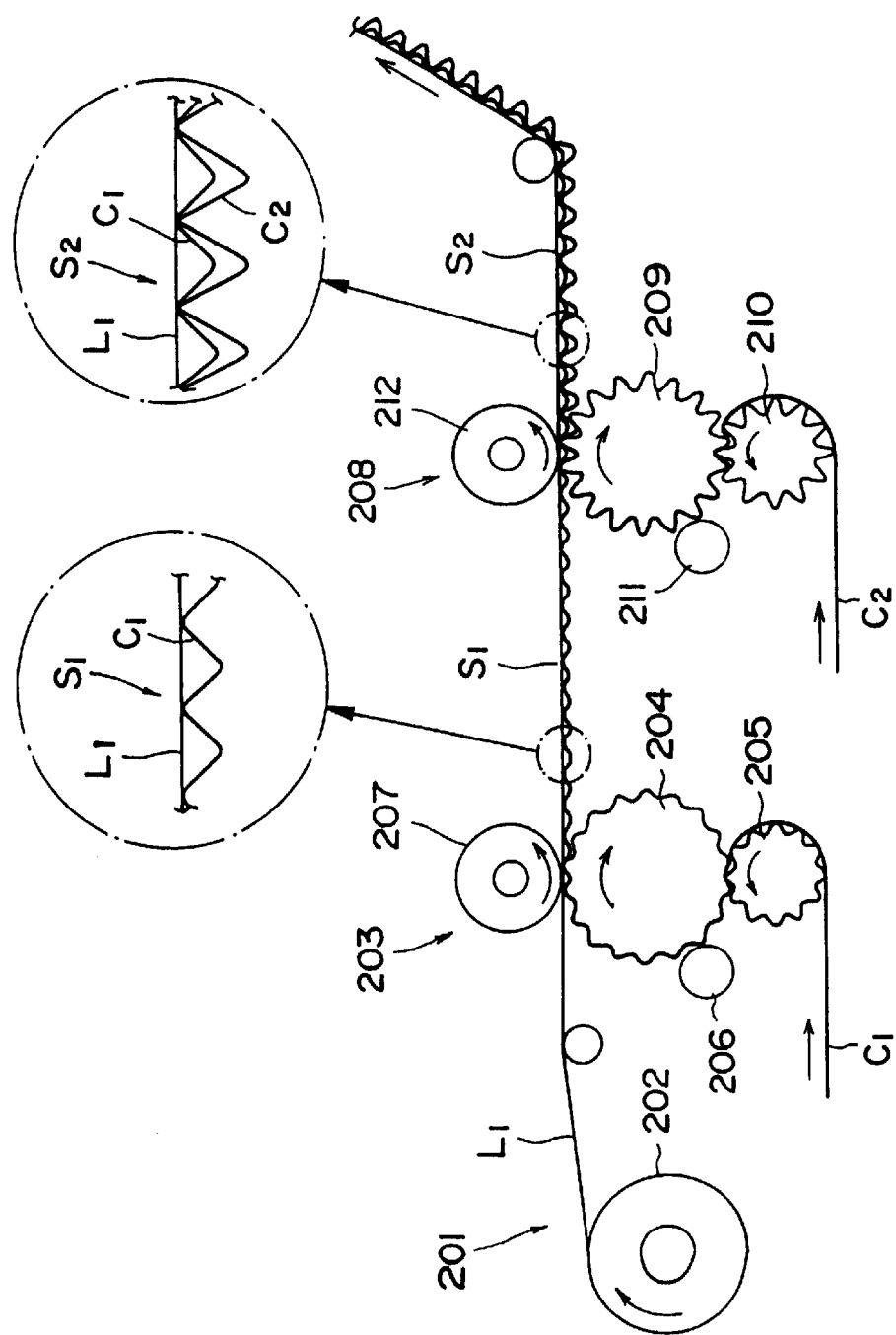
FIG. 10 is a schematic construction diagram of a double-faced corrugated board manufacturing system.

More specifically, the pitch measuring device 60 measures the corrugation pitch of the first core board $C_1$ of the single-faced corrugated board $S_1$ and calculates the pitch length P (P=M/N) of flute tips of the first core board $C_1$ from the results of detection obtained by the sensors 63 and 64, namely the traveling distance M of the single-faced corrugated board $S_1$ and the number N of corrugations of the first core board $C_1$. Then, the pitch measuring device 60 feeds back the result of the calculation to the first tension controller 61, which in turn operates so that the tension of the liner $L_1$ is adjusted by the first tension adjustor (brake unit) 27. As shown in the flowchart of FIG. 6, the corrugation pitch P of the first core board $C_1$ is measured in step T1, then in step T2 there is made judgment as to whether the pitch P is within the tolerance or not. If the answer is affirmative in step T2, the flow returns to step T1 to continue the measurement of the pitch P. On the other hand, if the answer is negative in step T2, the flow advances to step T3 to calculate an increment or decrement of tension taking paper physical properties into account. Further, in step T4, the first tension adjustor 59 adjusts the tension of the liner 59.

Figure 11:
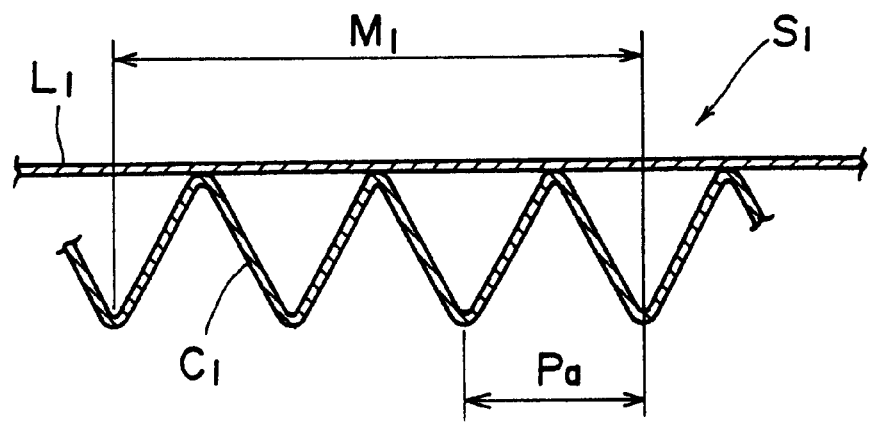
FIG. 11 is an explanatory diagram showing a single-faced corrugated board having a large flute tip pitch of a core board.
Figure 12:
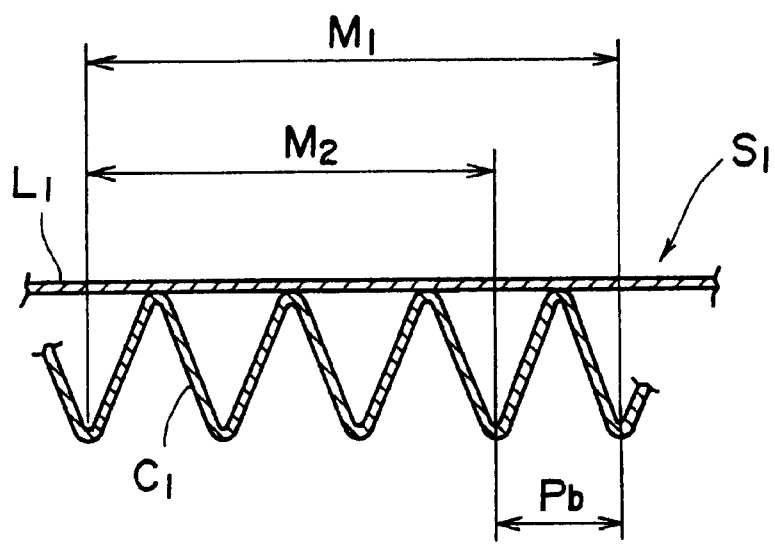
FIG. 12 is an explanatory diagram showing a single-faced corrugated board having a small flute tip pitch of a core board.

The tension adjustment for the liner $L_1$ is performed in the following manner. For example, as shown in FIG. 11, if the flute tip pitch $P_a$ of the first core board $C_1$ is larger than the target pitch P, the tension acting on the liner $L_1$ is increased so that the pitch P becomes narrow after contraction. Further, as shown in FIG. 12, if the flute tip pitch $P_b$ of the first core board $C_1$ is smaller than the target pitch P, the tension acting on the liner $L_1$ is decreased so that the pitch P becomes wide after contraction. Thus, when the corrugation pitch P of the first core board $C_1$ deviates from the target pitch P, the first tension adjustor 59 adjusts the tension in such a manner that the corrugation pitch of the first core board $C_1$ and that of the second core board $C_2$ become equal to each other, whereby both boards are laminated together accurately.

The phase shift measuring device 28 continues to measure a phase shift between the corrugations of the first core board $C_1$ of the single-faced corrugated board $S_1$ and the corrugations of the second core board $C_2$ to be laminated to the first core board. If there is a phase shift $\delta$ as the result of detection made by the pulse sensors 32 and 33, the phase shift measuring device 28 feeds it back to the tension controller 29, which in turn makes control so that the tension of the single-faced corrugated board $S_1$ is adjusted by the tension adjustor 27. As shown in the flowchart of FIG. 3 referred to previously in the first embodiment, the phase shift $\delta$ between the corrugation of the first core board $C_1$ and that of the second core board $C_2$ is measured in step S1, then in step S2 it is judged whether the phase shift $\delta$ is within the tolerance or not. If the answer is affirmative in step S2, the flow returns to step S2 to continue measuring the phase shift $\delta$. On the other hand, if the answer is negative in step S2, the flow advances to step S3 to calculate an increment or decrement of tension taking paper physical properties into account. Then, in step S4, the tension adjustor 27 adjusts the tension of the single-faced corrugated board $S_1$.

The tension adjustment for the single-faced corrugated board $S_1$ is performed in the following manner. For example, as shown in FIG. 13, if the flute tip pitch $P_1$ of the first core board $C_1$ is smaller than the flute tip pitch $P_2$ of the second core board $C_2$ and a phase shift of $+\delta$ is measured, the tension acting on the single-faced corrugated board $S_1$ is increased. As shown in FIG. 14, if the flute tip pitch $P_1$ of the first core board $C_1$ is larger than the flute tip pitch $P_2$ of the second core board $C_2$ and a phase shift of $-\delta$ is measured, the tension acting on the single-faced corrugated board $S_1$ is decreased. In this way, upon occurrence of a phase shift $\delta$ between the corrugations of the first and second core boards $C_1, C_2$, the tension adjustor 27 adjusts the tension of the single-faced corrugated board $S_1$, so that both core boards become coincident in phase with each other and are laminated together accurately.

In this way the shift of pitch P between the corrugations of the first and second core boards $C_1, C_2$, as well as the phase shift $\delta$, are corrected and the second core board $C_2$ is laminated accurately to the first core board $C_1$ to fabricate the single-faced corrugated board $S_2$. Thereafter, the board $S_2$ is fed to the double facer DF, as shown in FIG. 4. In the double facer DF, glue is applied to corrugation flute tips of the second core board $C_2$ of the board $S_2$, and the board $S_2$, with the liner $L_2$ laminated thereto, is fed between the paired pressure rollers 25 and 26. Then, predetermined amounts of heat and pressure are applied to the single-faced corrugated board $S_2$ and the liner $L_2$ which are in a laminated state, whereby there is fabricated a double-faced corrugated board S having a two-layer core board structure.

As described above in detail by way of embodiments, the corrugated board manufacturing system of the present invention is provided with a tension adjustor for adjusting the tension of a single-faced corrugated board formed by a single facer, a phase shift measurer for measuring a phase shift between the corrugations of a first core board of the single-faced corrugated board and the corrugations of a second core board to be laminated to the first core, and tension controller which operates so that the tension acting on the single-faced corrugated board is adjusted by the tension adjustor on the basis of the phase shift measured by the phase shift measurer. Thus, since the phase shift measurer measures the said phase shift and the tension of the single-faced corrugated board is adjusted on the basis of the measured phase shift, the corrugation phase of the first core board and that of the second core board become coincident with each other, thus permitting both core boards to be laminated together accurately, in the second single facer. Consequently, the quality of the corrugated board thus fabricated can be improved.

The corrugated board manufacturing system according to the present invention, in another aspect thereof, is provided with first tension adjustor for adjusting the tension of a liner, pitch measurer for measuring the corrugation pitch of a first core board of a single-faced corrugated board, first tension controller which operates so that the tension acting on the liner is adjusted by the first tension adjusor on the basis of the corrugation pitch measured by the pitch measurer, second tension adjustor for adjusting the tension of the single-faced corrugated board, phase shift measurer for measuring a phase shift between the corrugations of the first core board of the single-faced corrugated board and the corrugations of a second core board, and second tension controller which operates so that the tension acting on the single-faced corrugated board is adjusted by the second tension adjustor on the basis of the phase shift measured by the phase shift measurer. According to this construction, when there is a shift in the corrugation pitch of the first core board of the single-faced corrugated board, the tension acting on the liner is adjusted, whereby the corrugation pitch of the first core board and that of the second core board become coincident with each other, while when there is a phase shift between the corrugations of the first and second core boards, the tension of the single-faced core board is adjusted, whereby the corrugation phase of the first core board and that of the second core board become coincident with each other. Consequently, both core boards can be laminated together accurately and the quality of the corrugated board thus fabricated can be improved.

According to the corrugated board manufacturing system of the present invention, the tension adjustor adjusts the tension by exerting a resisting force which resists the traveling direction on the surface of the single-faced corrugated board or the surface of the liner which are being conveyed. Therefore, when a shift in the corrugation pitch of the first core board of the single-faced corrugated board is measured, or when a phase shift between the corrugations of the first and second core boards is measured, the tension adjustor exerts a resisting force which resists the traveling direction on the surface of the single-faced corrugated board or the surface of the liner, whereby the tension can be adjusted easily.

According to the corrugated board manufacturing system of the present invention, the first tension controller operates so that the tension acting on the liner is adjusted on the basis of the result of measurement provided from the pitch measurer and the amount of tension to be changed which is calculated from a database on paper physical properties of the liner. Therefore, the corrugation pitch of the first core board can be adjusted accurately according to the kind of paper used in the system.

According to the corrugated board manufacturing system of the present invention, the tension controller or the second tension controller operates so that the tension acting on the single-faced corrugated board is adjusted by the tension adjustor or the second tension adjustor on the basis of the result of measurement provided from the phase shift measurer and the amount of tension to be changed which is calculated from a data base on paper physical properties of the liner. Therefore, the phase shift between the first and second core boards can be adjusted accurately according to the kind of paper used.

We claim:

1. A corrugated board manufacturing system including a first single facer for laminating a first core board formed in a predetermined corrugated shape to a liner and a second single facer for laminating a second core board formed in a predetermined corrugated shape to said first core board of a single-faced corrugated board formed by said first single facer in such a manner that the corrugations of the second core board match the corrugations of the first core board, said corrugated board manufacturing system further including:

a first tension adjustor for adjusting the tension of the liner conveyed to said first single facer;

a pitch measurer for measuring the corrugation pitch of the first core board of the single-faced corrugated board formed by said first single facer;

a second tension adjustor for adjusting tension of the single-faced corrugated board formed by said first single facer;

a phase shift measurer for measuring a phase shift between the corrugations of the first core board of the single-faced corrugated board formed by said first single facer and the corrugations of said second core board to be laminated to the first core board;

a first tension controller which operates so that the tension acting on said liner is adjusted by said first tension adjustor on the basis of corrugation pitch of the first core board of said single-faced corrugated board measured by said pitch measurer; and a second tension controller which operates so that the tension acting on said single-faced corrugated board is adjusted by said second tension adjustor on the basis of the phase shift measured by said phase shift measurer.

2. A corrugated board manufacturing system according to claim 1, wherein said first tension controller operates so that the tension acting on said liner is adjusted by said first tension adjustor on the basis of both a result of measurement provided from said pitch measurer and an amount of tension to be changed which is calculated from a data base on paper physical properties of said liner.

3. A corrugated board manufacturing system according to claim 1, wherein said first and second tension adjustors adjust the tension by exerting a resisting force which resists a traveling direction on a surface of said single-faced corrugated board or a surface of said liner which are being conveyed.

4. A corrugated board manufacturing system according to claim 1, wherein said second tension controller operates so that the tension acting on said single-faced corrugated board is adjusted by said second tension adjustor on the basis of both a result of measurement provided from said phase shift measurer and an amount of tension to be changed which is calculated from a data base on paper physical properties of said liner.

* * * * *